United States Patent [19]

Bowen

[11] Patent Number: 5,700,222
[45] Date of Patent: Dec. 23, 1997

[54] FULL-TIME TRANSFER CASE WITH INTEGRATED PLANETARY GEAR ASSEMBLY

[75] Inventor: Thomas Bowen, Santa Rosa, Calif.

[73] Assignee: New Venture Gear, Inc., Troy, Mich.

[21] Appl. No.: 666,191

[22] Filed: Jun. 19, 1996

[51] Int. Cl.⁶ .................................................. F16H 37/08
[52] U.S. Cl. .......................... 475/204; 475/198; 475/220; 180/248
[58] Field of Search ........................... 475/198, 204, 475/205, 206, 207, 209, 220; 74/665 F, 665 G; 180/247, 248, 249, 233

[56] References Cited

U.S. PATENT DOCUMENTS

| | | |
|---|---|---|
| 3,845,671 | 11/1974 | Sharp et al. . |
| 3,848,691 | 11/1974 | Dolan . |
| 4,031,780 | 6/1977 | Dolan et al. . |
| 4,103,753 | 8/1978 | Holdeman . |
| 4,215,593 | 8/1980 | Shono et al. . |
| 4,344,335 | 8/1982 | Kawai . |
| 4,347,762 | 9/1982 | Holdeman . |
| 4,440,042 | 4/1984 | Holdeman . |
| 4,552,241 | 11/1985 | Suzuki . |
| 4,569,252 | 2/1986 | Harper . |
| 4,644,822 | 2/1987 | Batchelor . |
| 4,677,873 | 7/1987 | Eastman et al. . |
| 4,677,875 | 7/1987 | Batchelor . |
| 4,718,303 | 1/1988 | Fogelberg . |
| 4,770,280 | 9/1988 | Frost . |
| 4,776,444 | 10/1988 | Worner et al. . |
| 4,805,484 | 2/1989 | Hiraiwa . |
| 4,821,591 | 4/1989 | Adler . |
| 4,823,648 | 4/1989 | Hayakawa et al. .............. 180/247 X |
| 4,848,508 | 7/1989 | Smirl et al. . |
| 4,860,612 | 8/1989 | Dick et al. . |
| 4,883,138 | 11/1989 | Kameda et al. . |
| 4,920,828 | 5/1990 | Kameda et al. .................. 475/204 X |
| 4,976,671 | 12/1990 | Anderson . |
| 5,005,663 | 4/1991 | Niide et al. ...................... 180/248 X |
| 5,046,998 | 9/1991 | Frost . |
| 5,054,335 | 10/1991 | Andrews . |
| 5,076,112 | 12/1991 | Williams . |
| 5,284,068 | 2/1994 | Frost . |
| 5,323,871 | 6/1994 | Wilson et al. . |
| 5,334,116 | 8/1994 | Baxter, Jr. ....................... 180/249 X |
| 5,346,442 | 9/1994 | Eastman ........................... 475/220 X |
| 5,411,447 | 5/1995 | Frost . |
| 5,443,426 | 8/1995 | Frost ................................ 180/248 X |
| 5,443,429 | 8/1995 | Baxter, Jr. ........................ 475/204 |

OTHER PUBLICATIONS

"Automotive Handbook", Published By: Robert Bosch GmbH, 1986, Postfach 50, D–7000 Stuttgart, 1, Automotive Equipment Product Group, Dept For Technical Information.

Primary Examiner—Charles A. Marmor
Assistant Examiner—Peter T. Kwon
Attorney, Agent, or Firm—Harness, Dickey & Pierce, P.L.C.

[57] ABSTRACT

A transfer case for a four-wheel drive vehicle having a planetary gear assembly which integrates a gear reduction unit and an interaxle differential into a common arrangement. A clutch apparatus is operably associated with the planetary gear assembly and can be selectively shifted on-the-fly for establishing a full-time four-wheel high-range drive mode, a neutral non-driven mode, and a full-time four-wheel low-range drive mode.

17 Claims, 5 Drawing Sheets

FULL-TIME TRANSFER CASE WITH INTEGRATED PLANETARY GEAR ASSEMBLY

BACKGROUND OF THE INVENTION

The present invention relates generally to transfer cases for use in four-wheel drive vehicles and, more particularly, to such a transfer case having a dual-speed gear reduction unit and an interaxle differential integrated into a planetary gear assembly.

Modernly, the drivetrain in many light-duty and sport-utility vehicles is equipped with a transfer case for transmitting drive torque to all four of the wheels, thereby establishing a four-wheel drive mode of operation. To accommodate differing road surfaces and conditions, many transfer cases are equipped with a gear reduction unit for providing a high-range (i.e., direct ratio drive) and a low-range (i.e., reduced ratio drive) in conjunction with the four-wheel drive mode. Most commonly, the gear reduction unit used in such dual-speed transfer cases includes either a layshaft arrangement or a planetary gearset. Reference may be made to commonly-owned U.S. Pat. No. 4,770,280 for disclosure of an exemplary four-wheel drive transfer case equipped with a dual-speed planetary gearset.

Typically, four-wheel drive vehicles must be operating in a substantially non-motive condition when the transfer case is shifted between its four-wheel high-range and low-range drive modes. Unfortunately, the need to stop the vehicle prior to shifting between the available four-Wheel high-range and low-range drive modes is inconvenient, particularly upon encountering road conditions or surface terrains where continuation of the vehicle's rolling momentum would assist in overcoming the conditions encountered. To alleviate a portion of this inconvenience, gear reduction units have been designed which permit the vehicle operator to shift "on-the-fly" from the four-wheel low-range drive mode into the four-wheel high-range drive mode without stopping the vehicle. For example, U.S. Pat. No. 5,054,335 discloses a transfer case equipped with a synchronized range shift arrangement for "on-the-fly" shifting of a layshaft-type gear reduction unit. Alternatively, commonly-owned U.S. Pat. No. 5,346,442 discloses a transfer case having a synchronized range shift arrangement for "on-the-fly" shifting of a planetary-type gear reduction unit. While both designs advance the art, the need still exists to develop a gear reduction unit that can also be shifted "on-the-fly" from the four-wheel high-range drive mode into the four-wheel low-range drive mode.

In view of increased consumer popularity in four-wheel drive vehicles for everyday use, some dual-speed transfer cases are also equipped with an interaxle differential for permitting torque proportioning and differential speed variations between the front and rear axles. This allows the vehicle to be driven in a "full-time" four-wheel drive mode on dry pavement without causing excessive wear of the drivetrain components. Reference may be made to commonly-owned U.S. Pat. No. 4,677,873 for disclosure of an exemplary full-time dual-speed transfer case equipped with a single-planetary gear reduction unit and a dual-planetary interaxle differential. In an effort to minimize the overall size of such transfer cases, it has been proposed to incorporate the gear reduction unit and the interaxle differential into a common planetary gear assembly. One such arrangement is described in U.S. Pat. No. 4,644,822 which discloses a transfer case having "back-to-back" first and second planetary gearsets with common components that can be selectively shifted to establish different four-wheel drive modes. Likewise, each of commonly-owned U.S. Pat. Nos. 5,284,068 and 5,411,447 discloses a full-time dual-speed transfer case equipped with an integrated planetary gear assembly that is shifted as a unit to establish different drive modes. Finally, U.S. Pat. Nos. 4,677,875, 4,344,335, 4,215,593 and 4,805,484 each disclose a transfer case having a common planetary gear assembly which is operable to establish various drive modes through manipulation of one or more suitable shift mechanisms. While such prior art arrangements provide a compact construction, there is a continuing need to develop low cost, simplified alternatives which meet modern requirements for low noise and weight.

SUMMARY OF THE INVENTION

It is therefore an object of the present invention to provide a transfer case for a four-wheel drive vehicle having a planetary gear assembly which integrates a gear reduction unit and an interaxle differential into a common arrangement. A range shift mechanism is operably associated with the planetary gear assembly and can be selectively shifted for establishing a full-time four-wheel high-range drive mode, a neutral non-driven mode, and a full-time four-wheel low-range drive mode.

Another object of the present invention is to provide the range shift mechanism with synchronizers for permitting "on-the-fly" shifting of the transfer case between the full-time four-wheel high-range and low-range drive modes.

Yet another object of the present invention is to provide the range shift mechanism with a powershift arrangement for permitting "on-the-fly" shifting between the various drive modes.

A further object of the present invention is to provide the transfer case with a slip limiting/torque-biasing mechanism that is operable for controlling speed differentiation across the planetary gear assembly.

According to a preferred embodiment of the present invention, the planetary gear assembly is operably installed between an input member and first and second output members of the transfer case and is constructed in a compact arrangement. The planetary gear assembly includes first and second dual-planetary gearsets interconnected by a common carrier assembly. The first dual-planetary gearset is operably installed between the input member and the carrier assembly for driving the carrier assembly at either of a direct speed ratio (i.e., "high-range") or a reduced speed ratio (i.e., "low-range") relative to the input member. A range shift mechanism is provided in conjunction with the first dual-planetary gearset for permitting "on-the-fly" shifting between the high-range and low-range speed ratios. In addition, the common carrier assembly acts as the input to the second dual-planetary gearset, while its outputs are respectively connected to the first and second output members of the transfer case. Thus, the second dual-planetary gearset is operable for permitting speed differentiation and distributing drive torque between the first and second output members of the transfer case, thereby establishing a full-time four-wheel drive mode.

Additional objects, features and advantages of the present invention will become apparent from studying the following detailed description and appended claims when taken in conjunction with the accompanying drawings.

3

Figure 2:
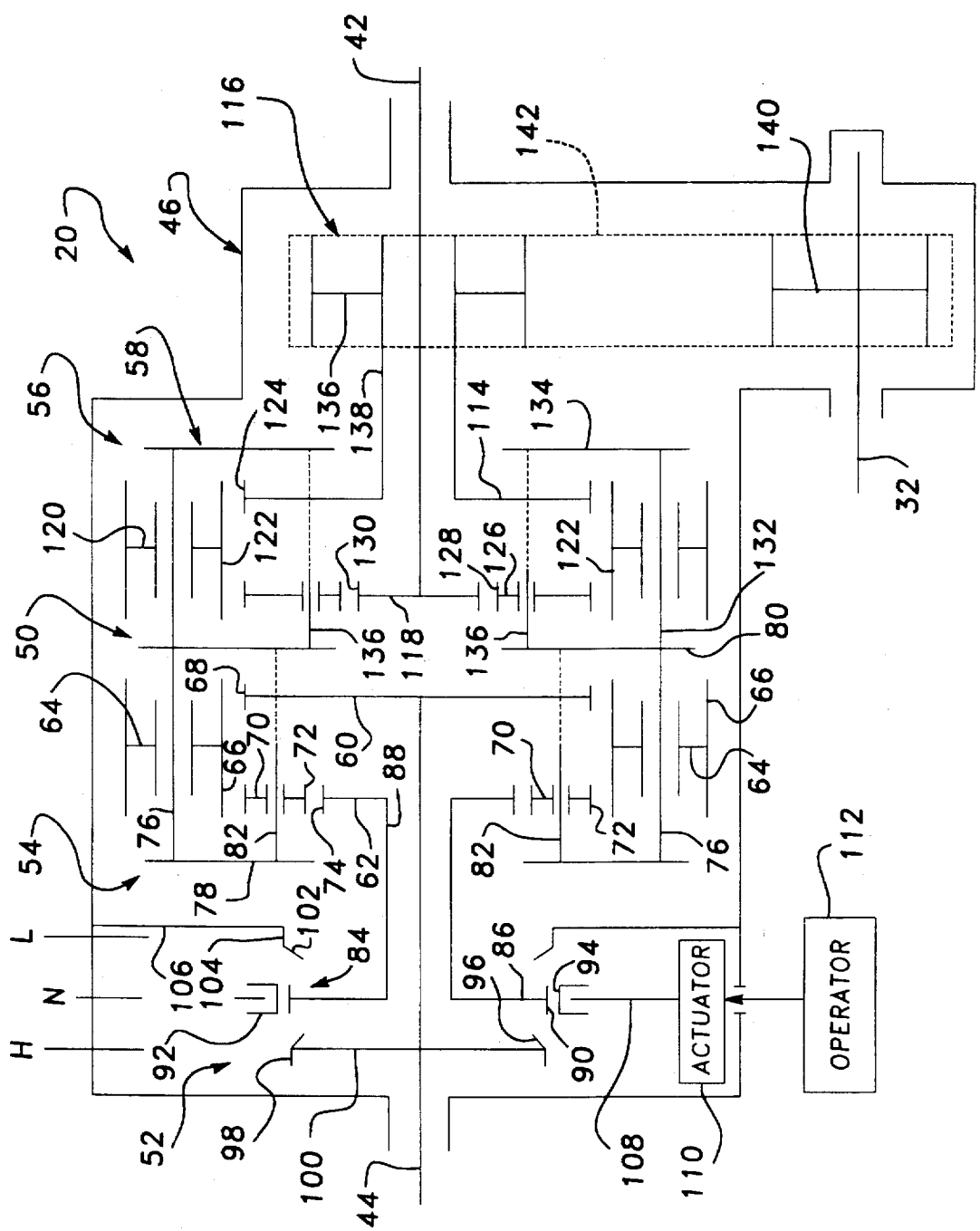
Figure 3:
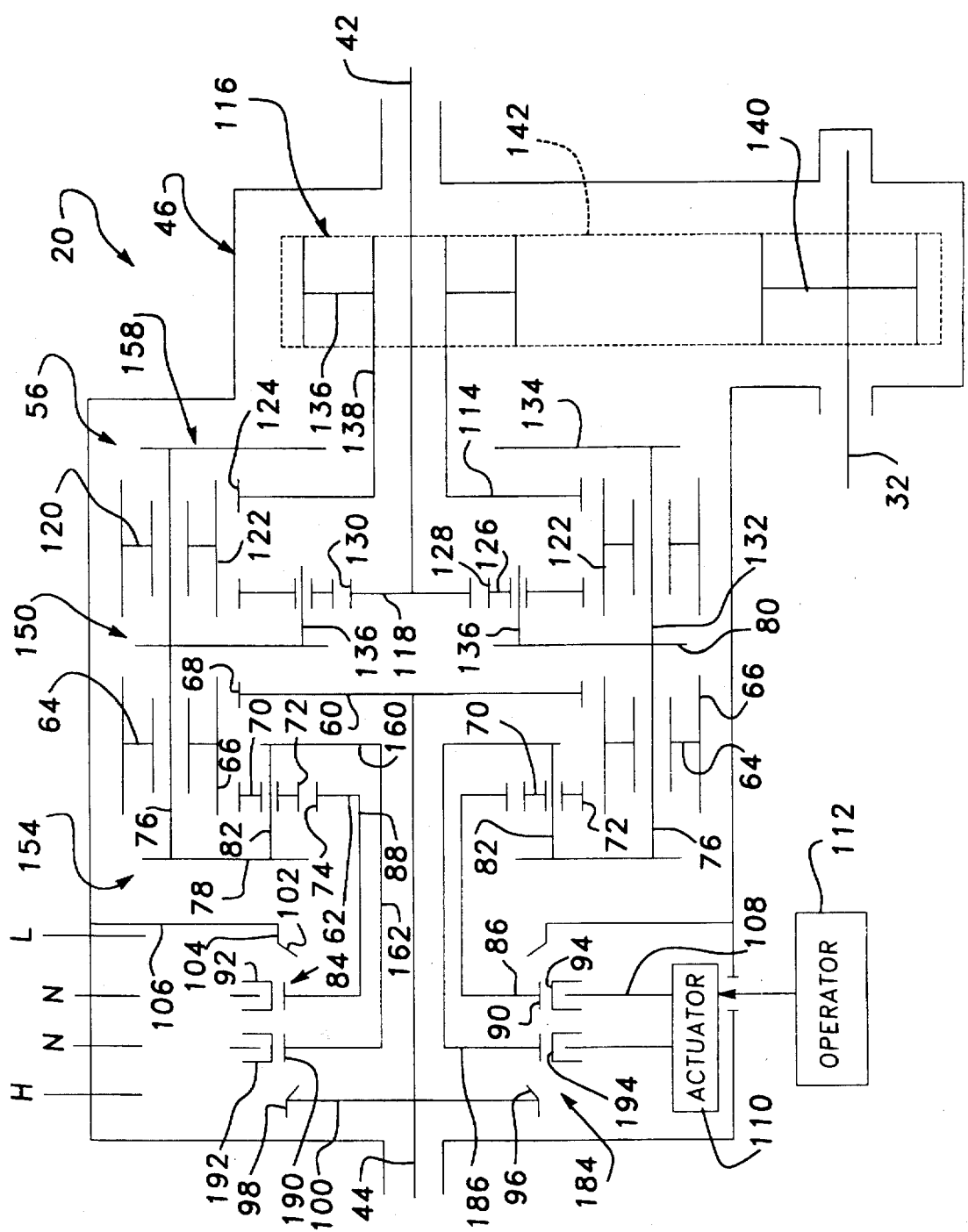
Figure 4:
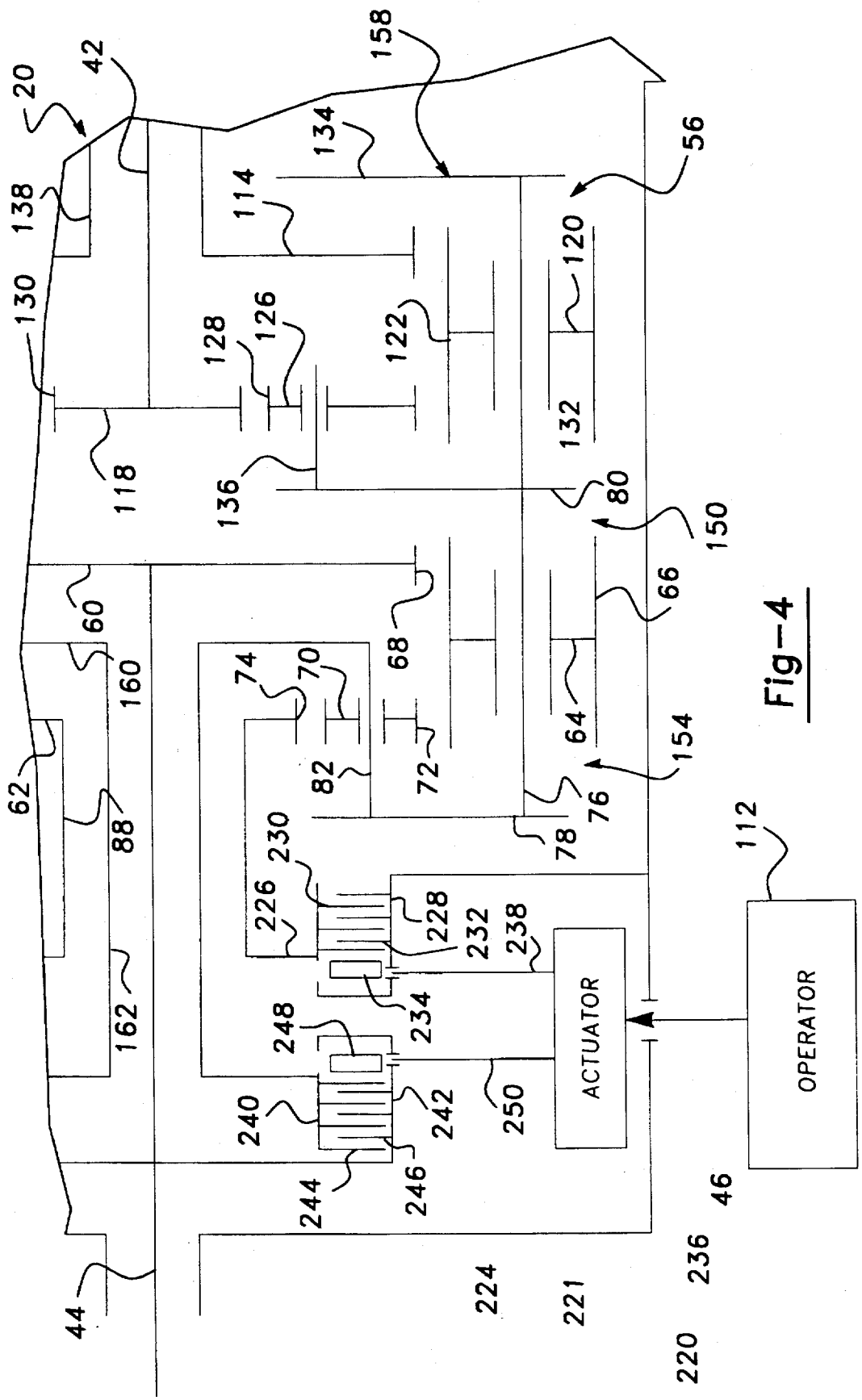
Figure 5:
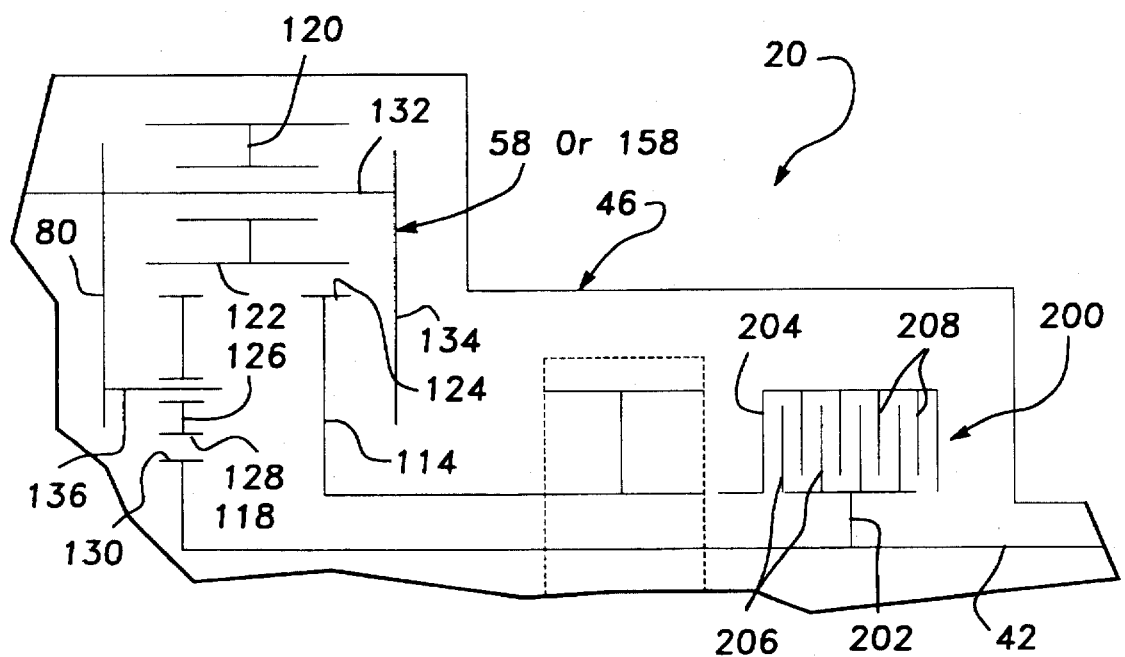

FIG. 2 is a schematic drawing of the full-time transfer case of the present invention;

FIG. 3 is a schematic drawing of an alternative embodiment for the full-time transfer case of the present invention;

FIG. 4 is a partial schematic drawing showing another alternative embodiment for the transfer case of the present invention; and FIG. 5 is a partial schematic drawing showing a slip limiting/torque-biasing mechanism that can be used with either of the full-time transfer cases shown in FIGS. 2 through 4.

DETAILED DESCRIPTION OF THE PREFERRED EMBODIMENTS

In general, the present invention relates to the combination of a gear reduction unit and an interaxle differential into an "integrated" planetary gear assembly. Preferably, the integrated planetary gear assembly is installed in the transfer case of a four-wheel drive motor vehicle for establishing full-time four-wheel high-range and low-range drive modes. Moreover, a range shift mechanism is operably associated with the integrated planetary gear assembly of the present invention and which includes means for permitting "on-the-fly" shifting of the transfer case between the low-range speed ratio and the high-range speed ratio during full-time four-wheel drive operation of the motor vehicle.

Figure 1:
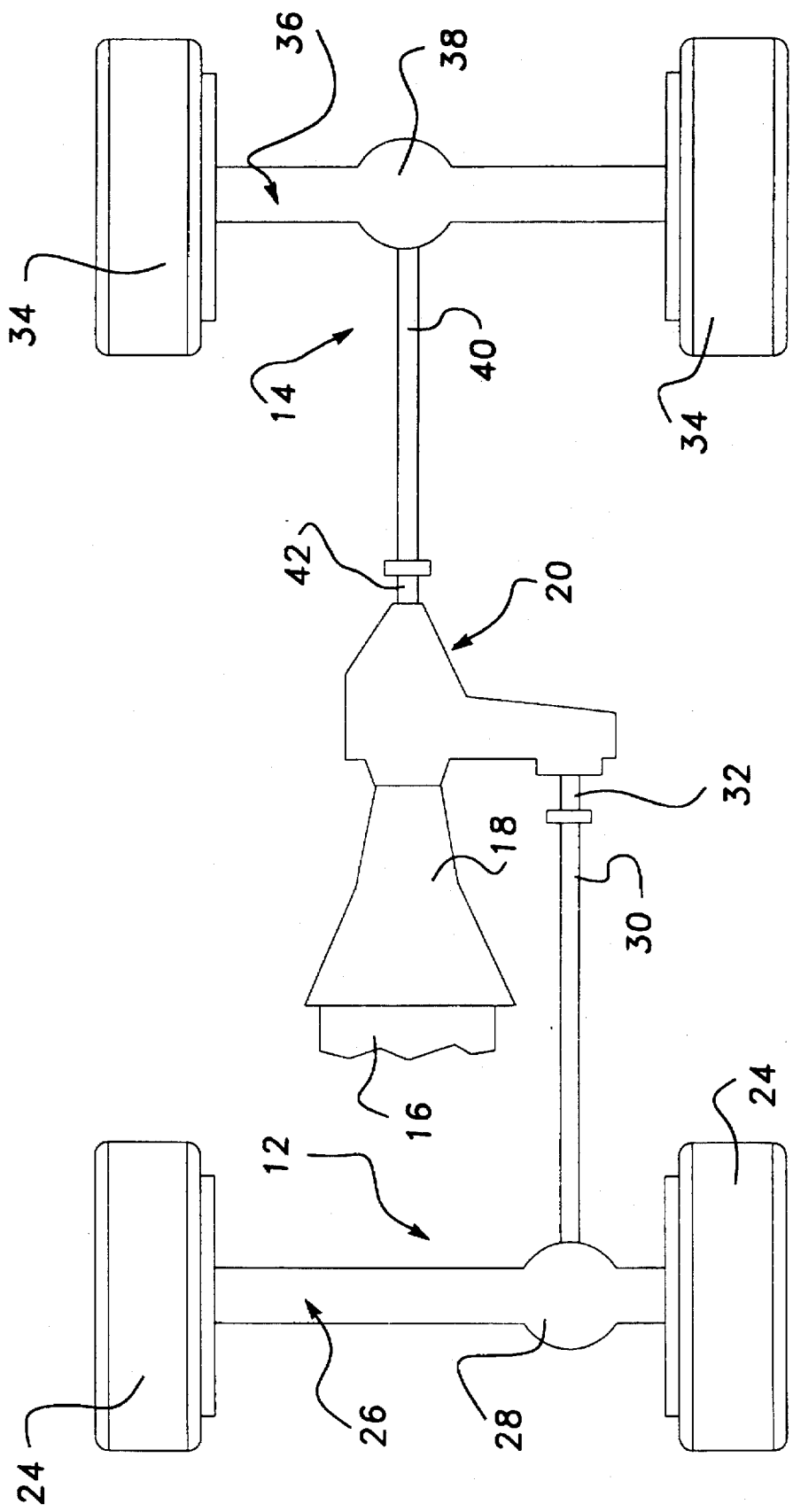
FIG. 1 illustrates the drivetrain of a four-wheel drive motor vehicle equipped with the full-time transfer case of the present invention.

With particular reference to FIG. 1 of the drawings, a drivetrain 10 for a four-wheel drive vehicle is shown. Drivetrain 10 includes a front driveline 12 and a rear driveline 14 both drivable from a source of power, such as an engine 16, through a transmission 18 which may be of either the manual or automatic type. In the particular embodiment shown, drivetrain 10 is an full-time four-wheel drive system which incorporates a transfer case 20 for transmitting drive torque from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propshaft 30, the opposite end of which is coupled to a front output shaft 32 of transfer case 20. Similarly, rear driveline 14 includes a pair or rear wheels 34 connected at opposite ends of a rear axle assembly 36 having a rear differential 38 coupled to one end of a rear propshaft 40, the opposite end of which is interconnected to a rear output shaft 42 of transfer case 20.

With particular reference to FIG. 2 of the drawings, transfer case 20 is schematically shown to include an input shaft 44 that is rotatably supported in a housing 46. Input shaft 44 is adapted for connection to an output shaft (not shown) of transmission 18 such that both are rotatably driven by engine 16 of the motor vehicle. Likewise, front output shaft 32 and rear output shaft 42 are rotatably supported in housing 46. As noted, front output shaft 32 is adapted for connection to front prop shaft 30 and rear output shaft 42 is adapted for connection to rear prop shaft 40. Transfer case 20 is shown to also include a planetary gear assembly 50 that is operably installed between input shaft 22 and front and rear output shafts 32 and 42, respectively. As will detailed, planetary gear assembly 50 integrates a dual-speed gear reduction unit and an interaxle differential into a single unit for establishing three distinct operational modes. The three operational modes include a full-time four-wheel high-range drive mode, a Neutral non-driven mode, and a full-time low-range drive mode. Transfer case 20 is further equipped with a synchronized range shift mechanism 52 for

4 permitting the vehicle operator to shift between the various operative modes without stopping the vehicle (i.e., "on-the-fly").

Planetary gear assembly 50 includes a first dual-planetary gearset 54 and a second dual-planetary gearset 56 interconnected by a common carrier assembly 58. First dual-planetary gearset 54 is operable for establishing the high-range drive mode by driving carrier assembly 58 at a direct speed ratio (i.e., 1:1) relative to input shaft 44. Likewise, first dual-planetary gearset 54 is operable for establishing the low-range drive mode by driving carrier assembly 58 at a reduced speed ratio (i.e., 0.51:1) relative to input shaft 44. Finally, first dual-planetary gearset 58 is operable for establishing the Neutral non-driven mode by interrupting the transfer of drive torque from input shaft 44 to common carrier assembly 58. Second dual-planetary gearset 56 functions as an interaxle differential to facilitate speed differentiation and distribute torque between front output shaft 32 and rear output shaft 42. As will be detailed, carrier assembly 58, when driven at either speed ratio, acts as the input of dual-planetary gearset 56 with the outputs thereof coupled to front output shaft 32 and rear output shaft 42.

First dual-planetary gearset 54 includes a first sun gear 60, a second sun gear 62, a set of full-length or first planet gears 64 each having teeth 66 meshed with teeth 68 of first sun gear 60, and a set of half-length of second planet gears 70 each having teeth 72 meshed with teeth 66 of a corresponding one of first planet gears 64 as well as with teeth 74 of second sun gear 62. As shown, first sun gear 60 is fixed for rotation with input shaft 44 while second sun gear 62 is supported for rotation relative to input shaft 44. In addition, each full-length planet gear 64 is rotatably supported on a pinion shaft 76, the opposite ends of which are mounted in first and second carrier rings 78 and 80, respectively, of carrier assembly 58. Similarly, each half-length planet gear 70 is rotatably supported on a pinion shaft 82 (partially shown in phantom), the opposite end of which are likewise mounted in first and second carrier rings 78 and 80, respectively. According to a presently preferred embodiment, first sun gear 60 has its gear teeth 68 located at a first radial distance from the principle axis of input shaft 44, while gear teeth 74 of second sun gear 62 are located at a second lesser radial distance relative to the principle axis. To provide the desired reduced speed ratio across first dual-planetary gearset 54, first sun gear 60 has twenty-eight teeth, second sun gear 62 has twenty-six teeth, each full-length planet gear 64 has twenty-three teeth, and each half-length planet gear 70 has twenty-eight teeth.

To provide means for selectively establishing the high-range and low-range drive connections between input shaft 44 and carrier assembly 58, synchronized range shift mechanism 52 is provided in conjunction with first dual-planetary gearset 54. As noted, synchronized range shift mechanism 52 is operable for permitting transfer case 20 to be shifted "on-the-fly" between its full-time four-wheel high-range and low-range drive modes. Synchronized range shift mechanism 52 includes a bi-directional clutch apparatus 84 that is operable for selectively coupling second sun gear 62 to either of input shaft 44 or housing 46. In particular, clutch apparatus 84 includes a hub 86 that is fixed to an axial extension 88 of second sun gear 62. Hub 86 has an outer cylindrical rim on which external splines 90 are formed. Clutch apparatus 84 further includes a range sleeve 92 having internal longitudinal splines 94 that are in constant mesh with external splines 90 on hub 86. Thus, range sleeve 92 is supported for concurrent rotation with and axial sliding movement on hub 86. Clutch apparatus 84 also includes a first synchronizer assembly 96 operably located between hub 86 and a first clutch plate 100 that is fixed to input shaft 44 and has clutch teeth 98 formed thereon. First synchronizer assembly 96 is operable for establishing speed synchronization between input shaft 44 and second sun gear 62 prior to permitting movement of range sleeve 92 to a high-range position (denoted by position line "H") whereat its splines 94 meshingly engage clutch teeth 98 on first clutch plate 100. Accordingly, with range sleeve 92 positioned in its high-range position, first sun gear 60 and second sun gear 62 are locked for inhibiting relative rotation therebetween which causes carrier assembly 58 to rotate at the same speed as input shaft 44 for establishing the high-range drive mode.

Clutch apparatus 84 further includes a second synchronizer assembly 102 operably disposed between hub 86 and a second clutch plate 106 that is fixed to housing 46 and has clutch teeth 104 formed thereon. Second synchronizer assembly 102 is operable for establishing speed synchronization between second sun gear 62 and housing 46 prior to permitting range sleeve 92 to move to a low-range position (denoted by position line "L") whereat its splines 94 meshingly engage clutch teeth 104 on second clutch plate 106 for establishing the reduced-ratio drive connection therebetween. As will be appreciated, second synchronizer assembly 102 functions as a brake for stopping rotation of second sun gear 62. Accordingly, with range sleeve 92 positioned in its low-range position, second sun gear 62 is grounded to housing 46 and held stationary such that carrier assembly 58 is driven at the reduced speed ratio relative to input shaft 44, thereby establishing the low-range drive mode. While only schematically shown, first synchronizer assembly 96 and second synchronizer assembly 102 can be any conventional construction such as, for example, single-cone or dual-cone arrangements. Thus, it will be appreciated by those skilled in the art that any type of suitable synchronizer arrangement can be used for facilitating speed synchronization between the components that are to be directly coupled.

Range sleeve 92 is shown in its Neutral position (denoted by position line "N") whereat its splines 94 are released from engagement with clutch teeth 98 on first clutch plate 100 and clutch teeth 104 on second clutch plate 106. As such, driven rotation of first sun gear 60 causes planet gears 64 and 70 to spin on their respective pinion shafts 76 and 82 and rotatably drive second sun gear 62. However, since range sleeve 92 does not couple second sun gear 62 to either of clutch plates 100 and 106, carrier assembly 58 remains stationary and no drive torque is transferred to front and rear output shafts 32 and 42, thereby establishing the Neutral non-driven mode.

Referring still to FIG. 2, range shift mechanism 52 is shown to include means for permitting the vehicle operator to move range sleeve 92 between its three distinct positions. Specifically, a shift fork 108 couples range sleeve 92 to an actuator 110 which is actuated by a shift operator 112 under the control of the vehicle operator. Actuator 110 can be any suitable apparatus that is operable for moving shift fork 108 and, in turn, range sleeve 92 between its three distinct positions. Preferably, a rotatable sector plate arrangement, similar to that described in commonly-owned U.S. Pat. No. 5,076,112 and hereby incorporated by reference, can be used with transfer case 20. Due to utilization of synchronizer assemblies 96 and 102, range sleeve 92 can be shifted on-the-fly between its three distinct positions for establishing the corresponding modes of operation. Finally, operator 112 can be any suitable mechanically-actuated (i.e., a linkage coupled to a gearshift lever) or power-actuated (i.e., a motor controlled by mode signals from push-buttons) arrangement under the control of the vehicle operator which controls actuation of actuator 110 for establishing the particular drive mode selected by the vehicle operator.

As noted, second dual-planetary gearset 56 functions as an interaxle differential to facilitate speed differentiation and distribute torque between front output shaft 32 and rear output shaft 42. Second dual-planetary gearset 56 includes a third sun gear 114 fixed via a chain drive assembly 116 to front output shaft 32, a fourth sun gear 118 fixed to rear output shaft 42, a set of full-length or third planet gears 120 each having teeth 122 meshed with teeth 124 of third sun gear 114, and a set of half-length or fourth planet gears 126 each having teeth 128 meshed with teeth 122 on a corresponding one of third planet gears 120 as well as with teeth 130 of fourth sun gear 118. Each third planet gear 120 is rotatably supported on a pinion shaft 132, the opposite ends of which are mounted in second and third carrier rings 80 and 134, respectively, of carrier assembly 58. Similarly, each fourth planet gear 126 is rotatably supported on a pinion shaft 136 (partially shown in phantom), the opposite ends of which are likewise mounted to second and third carrier rings 80 and 132, respectively. Third planet gears 120 and fourth planet gears 126 are equally-spaced on carrier assembly 58 with one third planet gear 120 constantly meshed with one fourth planet gear 126. As is known, the torque distribution ratio (i.e., torque split) normally delivered across second dual-planetary gearset 56 to output shafts 32 and 42 is determined by the number of gear teeth associated with third sun gear 114, fourth sun gear 118, third planet gears 120, and fourth planet gears 126. Chain drive assembly 116 is shown to include a drive sprocket 136 fixed to an axial extension 138 of third sun gear 114, a driven sprocket 140 fixed to front output shaft 32, and a continuous chain 142 interconnecting drive sprocket 136 to driven sprocket 140. Thus, driven rotation of carrier assembly 58, at either of the direct speed ratio or the reduced speed ratio, causes third sun gear 114 to drive front output shaft 32 and fourth sun gear 144 to drive rear output shaft 42. As such, "full-time" four-wheel high-range and low-range drive modes can be established across planetary gear assembly 50 with second planetary gearset 56 permitting speed differentiation to occur between front driveline 12 and rear driveline 14.

With particular reference now to FIG. 3, transfer case 20 is shown equipped alternatively with an integrated planetary gear assembly 150 operably interconnecting input shaft 44 to front and rear output shafts 32 and 42, respectively. Due to the similarity of planetary gear assembly 150 to the above-described planetary gear assembly 50, the same reference numerals are used to identify common or substantially similar components. Moreover, planetary gear assembly 150 includes a first dual-planetary gearset 154 and a second dual-planetary gearset 56 interconnected by a common carrier assembly 158. As will be clearly evident, first dual-planetary gearset 154 is largely identical to first dual-planetary gearset 54 (FIG. 2) with the exception that carrier assembly 158 includes a fourth carrier ring 160 having an axial extension 162 rotatably supported between input shaft 44 and axial extension 88 of second sun gear 62. Integrated planetary gear assembly 150 is operably associated with a synchronized range shift mechanism 152 for permitting the vehicle operator to shift on-the-fly between full-time four-wheel high-range and low-range drive modes.

Synchronized range shift mechanism 152 includes a clutch apparatus 184 that is operable for selectively coupling second sun gear 62 to housing 46 and for selectively coupling carrier assembly 158 to input shaft 44. In addition to the components described above for clutch apparatus 84, clutch apparatus 184 also includes a second hub 186 that is fixed to axial extension 162 of fourth carrier plate 160, and a second range sleeve 192 having internal longitudinal splines 194 that are in constant mesh with external splines 190 on second hub 186. Thus, second range sleeve 192 is supported for common rotation with an axial sliding movement on second hub 186. Synchronizer assembly 96 is operably disposed between second range sleeve 192 and first clutch plate 100 for establishing speed synchronization between input shaft 44 and carrier assembly 158 prior to permitting movement of second range sleeve 192 from its neutral position shown (denoted by position line "N") to a high-range position (denoted by position line "H") whereat its splines 194 meshingly engage clutch teeth 98 on first clutch plate 100. As shown, second synchronizer assembly 102 is again operably disposed between hub 86 and second clutch plate 106 for establishing speed differentiation between second sun gear 62 and housing 46 prior to permitting movement of range sleeve 92 from its neutral position shown (denoted by position line "N") to its low-range position (denoted by position line "L") whereat its splines 94 meshingly engage clutch teeth 104 on second clutch plate 106. Accordingly, with second range sleeve 192 positioned in its high-range position, and range sleeve 92 located in its neutral position, carrier assembly 158 is directly coupled to input shaft 44 for establishing the high-range drive mode. Moreover, with range sleeve 92 positioned in its low-range position and second range sleeve 192 located in its neutral position, the low-range drive mode is established between input shaft 44 and carrier assembly 158. Finally, with range sleeves 92 and 192 in their respective neutral positions, the Neutral non-driven mode is established.

Referring still to FIG. 3, an actuator 210 is shown to control the coordinated movement of shift fork 108 coupled to range sleeve 92 and a second shift fork 208 coupled to second range sleeve 192. Actuator 210 is operable for causing coordinated movement of range sleeves 92 and 192 in response to a particular drive mode selected by the vehicle operator via manipulation of operator 112. Actuator 210 can be a modified version of the rotatable sector plate arrangement described above or include a pair of separate actuation devices suitably connected to operator 112 for coordinated operation. Accordingly, when it is desired for transfer case 20 to operate in its full-time four-wheel high-range drive mode, the vehicle operator manipulates operator 112 for causing actuator 210 to locate range sleeve 92 in its neutral position and second range sleeve 192 in its high-range position. Likewise, when it is desired to shift transfer case 20 into the full-time four-wheel low-range drive mode, operator 112 is manipulated to cause actuator 210 to locating range sleeve 92 in its low-range position and locate second range sleeve 192 in its neutral position. Finally, when it is desired to shift transfer case 20 into its Neutral non-driven mode, actuator 210 is operable for locating range sleeves 92 and 192 in their respective neutral positions.

While FIG. 3 discloses carrier assembly 158 as having four carrier rings, it will be appreciated by those skilled in the art that second carrier ring 80 and fourth ring 160 can be integrated into a common ring member with axial extension 162 formed integral therewith or connected thereto. Thus, the arrangement disclosed in FIG. 3 is adapted to provide means for directly connecting carrier assembly 158 to input shaft 44 when it is desired to establish the high-range drive mode. Any construction of a carrier assembly providing such a means for direct coupling is considered an equivalent to that shown. With carrier assembly 158 directly coupled to input shaft 44 during operation of transfer case 20 in its full-time four-wheel high-range drive mode, pinion gears 70 and 64 are not loaded as is the case during high-range operation with the arrangement shown in FIG. 2.

Referring specifically to FIG. 4, transfer case 20 is shown equipped with integrated planetary gear assembly 150 which is operably associated with a range shift mechanism 220 for shifting on-the-fly between the full-time four-wheel high-range and low-range drive modes. In general, FIG. 4 illustrates a "powershift" type of range shift mechanism 220 substituted for "synchronized" range shift mechanism 152 shown in FIG. 3. As such, the same reference numbers are used to identify common or substantially similar components. Range shift mechanism 220 is a powershift arrangement permitting automatic or selective on-the-fly shifting of transfer case 20. Range shift mechanism 220 includes a clutch apparatus 221 that is operable for selectively coupling second sun gear 62 to housing 46 as well as for selectively coupling carrier assembly 158 to input shaft 44. In general, clutch apparatus 221 includes a first clutch assembly 222 that can be selectively actuated for coupling second sun gear 62 to housing 46 and a second clutch assembly 224 that can be selectively actuated for coupling carrier assembly 158 to input shaft 44.

With continued reference to FIG. 4, first clutch assembly 222 is shown to include an inner drum 226 that is fixed to axial extension 88 of second sun gear 62 and an outer drum 228 that is fixed to housing 46. First clutch assembly 222 also includes a set of inner clutch plates 230 fixed for rotation with inner drum 226 and which are alternately interleaved with a set of outer clutch plates 232 fixed for rotation with outer drum 228. A thrust mechanism 234 is provided for applying a compressive clutch engagement force on the interleaved clutch plates. Movement of thrust mechanism 234 is controlled by an actuator 236. Actuator 236 may be any power-operated (i.e., motor driven, electromagnetic, hydraulic, etc.) device or system operable for selectively actuating first clutch assembly 222. Leadline 238 represents the mechanical, electrical or hydraulic connection between actuator 236 and thrust mechanism 234 for controlling actuation of first clutch assembly 222. First clutch assembly 222 is operable in a non-actuated mode wherein a minimum clutch engagement force is exerted by thrust mechanism 234 on the interleaved clutch plates such that second sun gear 62 is permitted to rotate relative to housing 46. In addition, first clutch assembly 222 is also operable in an actuated mode wherein a maximum clutch engagement force is exerted by thrust mechanism 234 on the clutch plates such that second sun gear 62 is coupled to housing 46.

Second clutch assembly 224 includes an inner drum 240 that is fixed to axial extension 162 of fourth carrier plate 160 and an outer drum 242 that is fixed to input shaft 44. Second clutch assembly 224 includes a set of inner clutch plates 244 fixed for rotation with inner drum 240 and which are alternately interleaved with a set of outer clutch plates 246 fixed for rotation with outer drum 242. A thrust mechanism 248 is provided for exerting a compressive clutch engagement force on the interleaved clutch plates for controlling actuation of second clutch assembly 224. Leadline 250 indicates the connection between actuator 236 and thrust mechanism 248 for controlling actuation of second clutch assembly 224. Second clutch assembly 224 is operable in a non-actuated mode whereby carrier assembly 158 is free to rotate relative to input shaft 44. In contrast, second clutch assembly 224 is operable in an actuated mode for coupling carrier assembly 158 for common rotation with input shaft 44.

In operation, when second clutch assembly 224 is in its actuated mode and first clutch assembly 222 is in its non-actuated mode, carrier assembly 158 is directly coupled to input shaft 44 for establishing the full-time four-wheel high-range drive mode. Likewise, when first clutch assembly 222 is in its actuated mode and second clutch assembly 224 is in its non-actuated mode, second sun gear 62 is grounded to housing 46 for establishing the full-time four-wheel low-range drive mode. Finally, with first clutch assembly 22 in its non-actuated mode and second clutch assembly 224 in its non-actuated, the Neutral non-driven mode is established. Actuator 236 is operable for causing coordinated actuation of first and second clutch assemblies 222 and 224 in response to the particular drive mode selected by the vehicle operator via manipulation of operator 112.

With particular reference to FIG. 5, a slip limiting/torque-biasing mechanism 200 is shown operably interconnecting front output shaft 32 to rear output shaft 42 and which functions to provide a means for limiting interaxle speed differentiation therebetween. Slip limiting/torque-biasing mechanism 200 is shown to include an inner drum 202 fixed for rotation with rear output shaft 42 and an outer drum 204 fixed for rotation with drive sprocket 136 and thus with front output shaft 32. A clutch pack is disposed within slip limiting/torque-biasing mechanism 200 and includes a set of inner clutch plates 206 fixed for rotation with inner drum 202 and which are alternately interleaved with a set of outer clutch plates 207 fixed for rotation with outer drum 204. Slip limiting/torque-biasing mechanism 200 may be a self-contained device, such as a viscous coupling, that is operable "on-demand" for progressively limiting interaxle speed differentiation between rear output shaft 42 and front output shaft 32 in response to the occurrence of an excessive wheel slip condition. Commonly-owned U.S. Pat. No. 5,176,235 discloses a suitable viscous coupling apparatus, the entire disclosure which is incorporated by reference herein. Alternatively, slip limiting/torque-biasing mechanism 200 can include a thrust mechanism, such as a piston, the position of which can be controlled by an actuator for applying a variable compressive force on the interleaved clutch plates. The actuated condition of the actuator and the position of the piston can be hydraulically or electrically controlled. A suitable control system can be used for automatically controlling the compressive force applied to the interleaved clutch pack in response to various vehicular conditions (i.e., wheel slip) detected by suitable sensors. Furthermore, the control system may be adapted to permit the vehicle operator to select operation of transfer case 20 in a full-time four-wheel drive "locked" drive mode wherein slip limiting/torque-biasing mechanism 200 is fully actuated for inhibiting relative rotation between rear output shaft 42 and front output shaft 32.

The foregoing discussion discloses and describes various embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case for use in a four-wheel drive vehicle having a power source and front and rear drivelines, comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

a planetary gear assembly interconnecting said input shaft to said front and rear output shafts for delivering drive torque from the power source to the front and rear drivelines while permitting speed differentiation therebetween, said planetary gear assembly having first and second dual-planetary gearsets sharing a common carrier assembly, said first dual-planetary gearset including a first sun gear fixed for rotation with said input shaft, a second sun gear supported for rotation relative to said input shaft, a first planet gear rotatably supported by said carrier assembly and meshed with said first sun gear, and a second planet gear rotatably supported by said carrier assembly and meshed with said second sun gear and said first planet gear, said second dual-planetary gearset including a third sun gear fixed for rotation with said front output shaft, a fourth sun gear fixed for rotation with said rear output shaft, a third planet gear rotatably supported by said carrier assembly and meshed with said third sun gear, and a fourth planet gear rotatably supported by said carrier assembly and meshed with said fourth sun gear and said third planet gear; and a clutch apparatus for selectively coupling one of said second sun gear and said carrier assembly to said input shaft for driving said carrier assembly at a direct speed ratio relative to said input shaft for establishing a full-time four-wheel high-range drive mode, and said clutch apparatus is further operable for selectively coupling said second sun gear to said housing for driving said carrier assembly at a reduced speed ratio relative to said input shaft for establishing a full-time four-wheel low-range drive mode.

2. The transfer case of claim 1 wherein said clutch apparatus includes synchronizer means for causing speed synchronization between said input shaft and said one of said second sun gear and said carrier assembly, and said synchronizer means is further operable for causing speed synchronization between said housing and said second sun gear.

3. The transfer case of claim 2 wherein said clutch apparatus includes a range sleeve rotatably driven by said second sun gear and movable between a neutral position and high-range and low-range positions, said range sleeve is operable in said high-range position to couple said second sun gear for common rotation with said input shaft and in said low-range position to couple said second sun gear to said housing, and said range sleeve is operable in said neutral position to uncouple said second sun gear from both of said input shaft and said housing for establishing a Neutral non-driven mode.

4. The transfer case of claim 3 wherein said synchronizer means includes a first synchronizer operably disposed between said second sun gear and said input shaft for inhibiting movement of said range sleeve to said high-range position until speed synchronization is established therebetween, and a second synchronizer operably disposed between said second sun gear and said housing for inhibiting movement of said range sleeve to said low-range position till speed synchronization is established therebetween.

5. The transfer case of claim 4 wherein said clutch apparatus includes a hub fixed for rotation with said second sun gear and on which said range sleeve is supported for rotation therewith and movement thereon between said high-range, low-range and neutral positions, a first clutch plate fixed to said input shaft, and a second clutch plate fixed to said housing, wherein said first synchronizer is disposed between said hub and said first clutch plate for inhibiting movement of said range sleeve into said high-range position whereat said range sleeve is coupled to said first clutch plate until speed synchronization is established therebetween, and wherein said second synchronizer is disposed between said hub and said second clutch plate for inhibiting movement of said range sleeve to said low-range position whereat said range sleeve is coupled to said second clutch plate until speed synchronization is established therebetween.

6. The transfer case of claim 2 wherein said clutch apparatus includes a first range sleeve rotatably driven by said second sun gear that is movable between a neutral position and a low-range position, a second range sleeve rotatably driven by said carrier assembly that is movable between a neutral position and a high-range position, and an actuator for moving said first and second range sleeves, said first range sleeve is operable in its neutral position to uncouple said second sun gear from said housing and is further operable in its low-range position to couple said second sun gear to said housing, said second range sleeve is operable in its neutral position to uncouple said carrier assembly from said input shaft and is further operable in its high-range position for coupling said carrier assembly to said input shaft, and wherein said actuator is operable for locating said first range sleeve in said neutral position and said second range sleeve in said high-range position for establishing said full-time four-wheel high-range drive mode, said actuator is operable for locating said first range sleeve in said low-range position and second range sleeve in said neutral position for establishing said full-time four-wheel low-range drive mode, and said actuator is operable for locating said first range sleeve in said neutral position and said second range sleeve in said neutral position for interrupting the delivery of drive torque from said input shaft to said carrier assembly for establishing a Neutral non-driven mode.

7. The transfer case of claim 6 wherein said synchronizer means includes a first synchronizer operably disposed between said housing and said second sun gear for inhibiting movement of said first range sleeve to said low-range position until speed synchronization is established therebetween, and a second synchronizer operably disposed between said input shaft and said carrier assembly for inhibiting movement of said second range sleeve to said high-range position until speed synchronization is established therebetween.

8. The transfer case of claim 1 further comprising a slip limiting/torque-biasing mechanism operably disposed between said front and rear output shafts for regulating speed differentiation therebetween in response to excessive slip of one of the front and rear drivelines.

9. The transfer case of claim 1 wherein said clutch apparatus includes a first clutch assembly disposed between said housing and said second sun gear and a second clutch assembly disposed between said input shaft and said carrier assembly, said first clutch assembly is operable in a non-actuated mode to permit rotation of said second sun gear relative to said housing and in an actuated mode to couple said second sun gear to said housing for preventing rotation of said second sun gear, said second clutch assembly is operable in a non-actuated mode to permit rotation of said carrier assembly relative to said input shaft and in an actuated mode for coupling said carrier assembly for common rotation with said input shaft, said clutch apparatus further includes an actuator for controlling actuation of said first and second clutch assemblies, said actuator is operable to shift said first clutch assembly into its non-actuated mode and said second clutch assembly into its actuated mode for establishing said full-time four-wheel high-range drive mode, and said actuator is operable to shift said first clutch assembly into its actuated mode and said second clutch assembly into its non-actuated mode for establishing said full-time four-wheel low-range drive mode.

10. The transfer case of claim 9 wherein said actuator is operable for shifting said first and second clutch assemblies into their respective non-actuated modes for interrupting delivery of drive torque from said input shaft to said carrier assembly for establishing a Neutral non-driven mode.

11. A transfer case for use in a four-wheel drive vehicle having a power source and front and rear drivelines, comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

a planetary gear assembly interconnecting said input shaft to said front and rear output shafts for delivering drive torque from the power source to the front and rear drivelines while permitting speed differentiation therebetween, said planetary gear assembly having first and second dual-planetary gearsets sharing a common carrier assembly, said first dual-planetary gearset including a first sun gear fixed for rotation with said input shaft, a second sun gear supported for rotation relative to said input shaft, a first planet gear rotatably supported by said carrier assembly and meshed with said first sun gear, and a second planet gear rotatably supported by said carrier assembly and meshed with said second sun gear and said first planet gear, said second dual-planetary gearset including a third sun gear fixed for rotation with said front output shaft, a fourth sun gear fixed for rotation with said rear output shaft, a third planet gear rotatably supported by said carrier assembly and meshed with said third sun gear, and a fourth planet gear rotatably supported by said carrier assembly and meshed with said fourth sun gear and said third planet gear; and a clutch apparatus including a range sleeve coupled for rotation with said second sun gear and movable between a high-range position coupling said second sun gear for rotation with said input shaft, a low-range position coupling said second sun gear to said housing, and a neutral position uncoupling said second sun gear from both of said input shaft and said housing, and an actuator for moving said range sleeve between its three positions for establishing one of a full-time four-wheel high-range drive mode, a full-time four-wheel low-range drive mode, and a Neutral non-driven mode, whereby location of said range sleeve in said high-range position causes said carrier assembly to be rotatably driven at a direct speed ratio relative to said input shaft for establishing said full-time four-wheel high-range drive mode, wherein location of said range sleeve in said low-range position causes said carrier assembly to be driven at a reduced speed ratio relative to said input shaft for establishing said full-time four-wheel low-range drive mode, and wherein location of said range sleeve in said neutral position establishes said Neutral non-driven mode.

12. The transfer case of claim 11 wherein said clutch apparatus further comprises a first synchronizer that is operably disposed between said input shaft and said second sun gear for inhibiting movement of said range sleeve to said high-range position until speed synchronization is established therebetween, and a second synchronizer that is operably disposed between said housing and said second sun gear for inhibiting movement of said range sleeve to said low-range position till speed synchronization is established therebetween.

13. The transfer case of claim 11 further comprising a slip limiting/torque-biasing mechanism operably disposed between said front and rear output shafts for regulating speed differentiation therebetween in response to excessive slip of one of the front and rear drivelines.

14. A transfer case for use in a four-wheel drive vehicle having a power source and front and rear drivelines, comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

a planetary gear assembly interconnecting said input shaft to said front and rear output shafts for delivering drive torque from the power source to the front and rear drivelines while permitting speed differentiation therebetween, said planetary gear assembly having first and second dual-planetary gearsets sharing a common carrier assembly, said first dual-planetary gearset including a first sun gear fixed for rotation with said input shaft, a second sun gear supported for rotation relative to said input shaft, a first planet gear rotatably supported by said carrier assembly and meshed with said first sun gear, and a second planet gear rotatably supported by said carrier assembly and meshed with said second sun gear and said first planet gear, said second dual-planetary gearset including a third sun gear fixed for rotation with said front output shaft, a fourth sun gear fixed for rotation with said rear output shaft, a third planet gear rotatably supported by said carrier assembly and meshed with said third sun gear, and a fourth planet gear rotatably supported by said carrier assembly and meshed with said fourth sun gear and said third planet gear; and a clutch apparatus including a first range sleeve coupled for rotation with said carrier assembly and movable between a high-range position whereat said first range sleeve couples said carrier assembly for common rotation with said input shaft and a neutral position whereat said carrier assembly rotates relative to said input shaft, a second range sleeve coupled for rotation with said second sun gear and movable between a low-range position whereat said second range sleeve couples said second sun gear to said housing and a neutral position whereat said second sun gear is uncoupled from said housing, and an actuator for moving said first and second range sleeves to establish one of a full-time four-wheel high-range drive mode, a full-time four-wheel low-range drive mode, and a Neutral non-driven mode, wherein said actuator is operable for locating said first range sleeve in its high-range position and said second range sleeve in its neutral position for establishing said full-time four-wheel high-range drive mode, wherein said actuator is operable for locating said first range sleeve in its neutral position and said second range sleeve in its low-range position for establishing said full-time four-wheel low-range drive mode, and wherein said actuator is operable for locating said first range sleeve in its neutral position and said second range sleeve in its neutral position for establishing said Neutral non-driven mode.

15. The transfer case of claim 14 wherein said clutch apparatus further comprises a first synchronizer operably disposed between said input shaft and said carrier assembly for inhibiting movement of said first range sleeve to said high-range position until speed synchronization is established therebetween, and a second synchronizer that is operably disposed between said housing and said second sun gear for inhibiting movement of said second range sleeve to said low-range position until speed synchronization is established therebetween.

16. The transfer case of claim 14 further comprising a slip limiting/torque-biasing mechanism operably disposed between said front and rear output shafts for irregulating speed differentiation therebetween in response to excessive slip of one of the front and rear drivelines.

17. A transfer case for use in a four-wheel drive vehicle having a power source and front and rear drivelines, comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

a planetary gear assembly interconnecting said input shaft to said front and rear output shafts for delivering drive torque from the power source to the front and rear drivelines while permitting speed differentiation therebetween, said planetary gear assembly having first and second dual-planetary gearsets sharing a common carrier assembly, said first dual-planetary gearset including a first sun gear fixed for rotation with said input shaft, a second sun gear supported for rotation relative to said input shaft, a first planet gear rotatably supported by said carrier assembly and meshed with said first sun gear, and a second planet gear rotatably supported by said carrier assembly and meshed with said second sun gear and said first planet gear, said second dual-planetary gearset including a third sun gear fixed for rotation with said front output shaft, a fourth sun gear fixed for rotation with said rear output shaft, a third planet gear rotatably supported by said carrier assembly and meshed with said third sun gear, and a fourth planet gear rotatably supported by said carrier assembly and meshed with said fourth sun gear and said third planet gear; and a powershift mechanism including a first clutch assembly that is operable in a non-actuated mode to permit rotation of said second sun gear relative to said housing and in an actuated mode for coupling said second sun gear to said housing, a second clutch assembly that is operable in a non-actuated mode to permit rotation of said carrier assembly relative to said input shaft and in an actuated mode for coupling said carrier assembly for common rotation with said input shaft, and an actuator for controlling actuation of said first and second clutch assemblies for establish one of a full-time four-wheel high-range drive mode, a full-time four-wheel low-range drive mode, and a Neutral non-driven mode, wherein said actuator is operable for shifting said first clutch assembly into its non-actuated mode and said second clutch assembly into its actuated mode for establishing said full-time four-wheel high-range drive mode, wherein said actuator is operable for shifting said first clutch assembly into its actuated mode and said second clutch assembly into its non-actuated mode for establishing said full-time four-wheel low-range drive mode, and wherein said actuator is operable for shifting said first and second clutch assemblies into their respective non-actuated modes for establishing said Neutral non-driven mode.

* * * * *